March 31, 1959 R. E. WADDELL ET AL 2,879,985
LOADING DOCK GUARD
Filed March 5, 1957 2 Sheets-Sheet 1

INVENTORS:
ROBERT E. WADDELL, and
JAMES B. WADDELL.
BY Eaton, Bell, Hunt + Seltzer
ATTORNEYS.

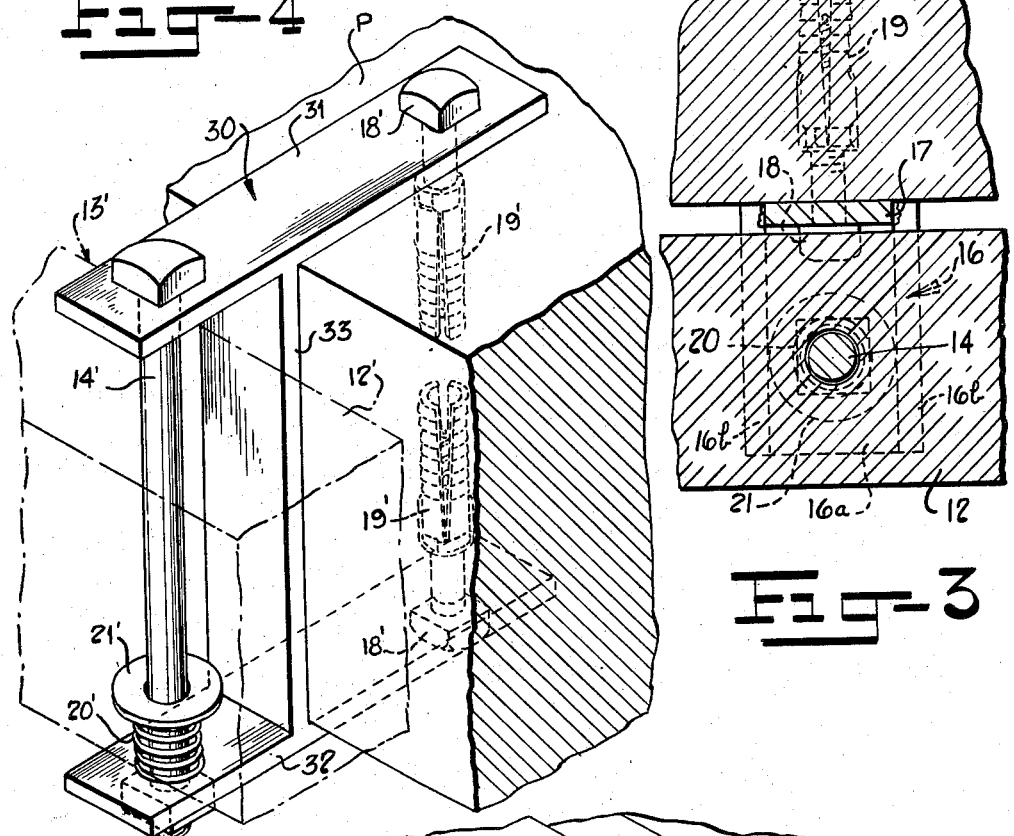
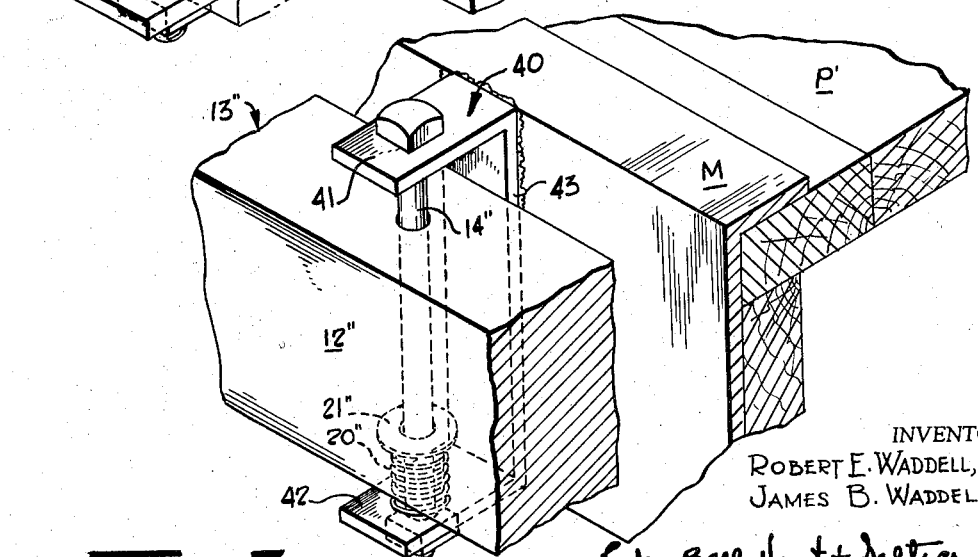

United States Patent Office 2,879,985
Patented Mar. 31, 1959

2,879,985

LOADING DOCK GUARD

Robert E. Waddell and James B. Waddell, Charlotte, N.C., assignors to Waddell Construction Company, Inc., Charlotte, N.C., a corporation of North Carolina Application March 5, 1957, Serial No. 644,164

6 Claims. (Cl. 267—1)

This invention relates to protective bumpers or guards for docks, warehouses or other structures subject to damaging impact of large vehicles or other heavy mobile equipment.

Experience has revealed that the usual wood, steel or rubber protective guards employed in truck loading docks or platforms have to be replaced quite frequently due to the same being damaged or twisted from their mountings by the up and down movement of the truck body during the loading or unloading of the same. In loading or unloading the truck, it is common practice to abut the truck against the protective guard and as the cargo is unloaded from the truck, the decrease in weight causes the bed of the truck to rise with the result that the guard is subjected to a twisting action. Conversely, when an empty truck is abutted against a guard preparatory to loading the same, the truck bed is depressed as the cargo is loaded on the truck which also subjects the guard to a twisting action.

With the foregoing in mind, it is the primary object of this invention to provide a protective guard for a dock or warehouse platform wherein the guard is slidably mounted to freely move up and down as the truck is loaded or unloaded to avoid it being twisted loose from its mountings.

It is more specifically an object of the invention to provide a protective guard for a loading platform comprising a bumper bar having its opposite ends slidably mounted for vertical movement in a pair of brackets each of which brackets are provided with resilient means for resiliently supporting the bumper bar to normally maintain the bumper bar in a medial position in the brackets to provide sufficient room for the bumper bar to be lowered as when a truck abutting the same is being loaded or to be raised as when a truck abutting the same is being unloaded.

Some of the objects of the invention having been stated, other objects will appear as the description proceeds, when taken in connection with the accompanying drawings in which—

Figure 3 is a greatly enlarged horizontal sectional view taken along line 3—3 in Figure 2 and showing the manner in which the ends of the bumper bar are supported in the supporting brackets;

Figure 4 is a perspective view of one end of a modified form of the invention shown secured to an unloading platform;

Figure 5 is a perspective view of a second modified form of the invention with the guard shown supported from an unloading platform of the type wherein an angle iron covers its outer face or side wall.

Figure 1:
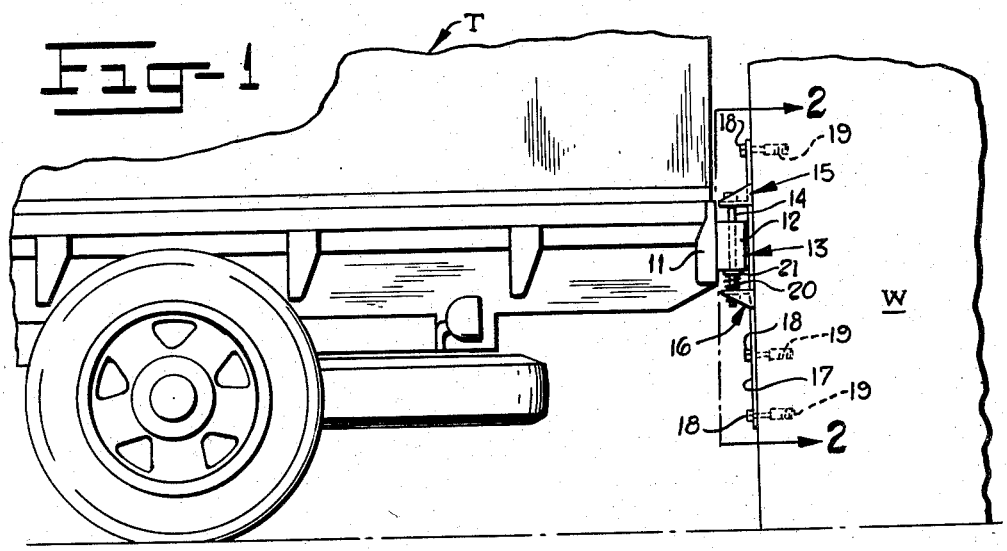
Figure 1 is a side elevational view of the protective guard shown secured to the wall of a building with the rear end of a truck shown abutting the same.
Figure 2:
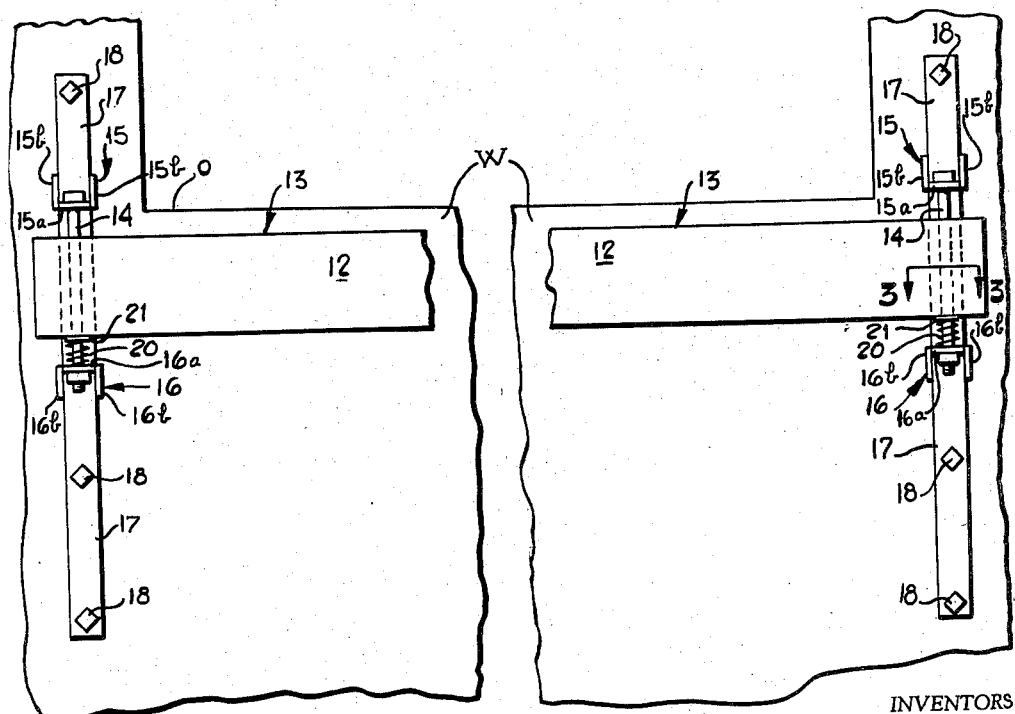
Figure 2 is a greatly enlarged front elevation taken along line 2—2 of Figure 1.

Referring more specifically to the drawings, and particularly Figures 1 to 3, T broadly indicates the rear end of a truck or similar powered vehicle provided with a transverse member 11 at the rear end thereof which is shown in abutting relation to an elongated bumper bar 12 of a protective guard broadly indicated by reference number 13. The bumper bar 12 is preferably formed from wood which has a certain amount of inherent resiliency therein, but may be formed of any suitable material such as steel, rubber or an alloy if so desired.

The bumper bar 12 if desired may be provided with resilient means secured to its outer face, such as a layer of rubber or an arrangement of springs or the like. The opposite ends of the bumper bar 12 are provided with vertically arranged bores which are loosely penetrated by relatively long rods or bolts 14 each of which are supported in upper and lower brackets 15, 16, respectively, secured to elongated steel straps or supports 17 which are suitably secured by bolts 18 and anchoring sleeves 19 to a wall W.

The upper and lower brackets 15 and 16 are preferably formed by welding pairs of gusset plates 15b and 16b to the opposite side edges of the supports 17 and by welding to the proximal sides of the gusset plates transverse plate members 15a, 16a, respectively. A spring 20 surrounds the lower end of each of the bolts 14 with its lower end resting on the transverse plate members 16a and its upper end terminating in a flattened portion or being provided with a washer 21 against which rests the lower edge of the bumper bar 12 for resiliently mounting the same in the brackets.

An opening O is shown in the wall W of the building in Figure 2 through which opening the cargo for loading or being unloaded from the truck T is to be moved. As will be observed in Figure 2, the supports 17 are so positioned relative to the opening O that the plate members 15a of the upper brackets 15 are in substantial alinement with the lower edge of the opening O to prevent the bumper bar 12 from ever extending above the lower edge of the opening. The bumper bar 12 as shown in Figure 2 is thus so mounted that it can freely move upwardly from its position shown therein to the lower edge of the opening O as when a truck abutting the same is being unloaded. Also, the supporting of the bumper bar 12 on the springs 20 enables the bumper bar 12 to be lowered upon a truck abutting the same being loaded which lowers the body of the truck to compress the springs.

Referring now to Figure 4, a second embodiment of the invention is shown wherein a protective guard 13' is shown secured to the outer ends of a cantilevered wall or platform P. All of the elements similar to the elements in the first form of the invention will bear the same reference numeral with the prime notation added. This second embodiment differs from the first embodiment of the invention only in the type of bracket which is used for supporting the same and the manner in which the same is secured to the wall or platform structure to be protected.

An I-shaped bracket broadly indicated by reference numeral 30 is suitably secured to the outwardly extending end of a dock or platform P to position the bumper bar 12' along its outer edge to protect the same against impact. The bracket 30 comprises parallel and outwardly disposed upper and lower leg portions 31, 32, respectively. A web portion 33 joins the upper and lower legs at their medial portion and is positioned to abut the outer face of the platform P. The relatively long bolt 14' penetrates the outer ends of the upper and lower legs 31 and 32 and floatingly secures the bumper bar 12' therebetween on the springs 20' in a similar manner as in the first form of the invention. The inner ends of the upper and lower legs 31, 32 are suitably penetrated by bolts 18' which are secured in anchoring sleeves 19' imbedded in the platform P.

Now referring to Figure 5 wherein the third form of the invention is shown, it will be observed from comparing this form with the second form of the invention shown in Figure 4, that this form differs therefrom only by the shape of the supporting bracket and the manner in which the same is secured to the platform. In this form of the invention, the platform or dock P' is provided with an angle iron protecting member M which covers the outer face of the platform and a small portion of its upper edge. All similar or identical parts in this form of the invention will bear the same reference numeral as in the other two forms with the double prime notation added thereto.

A U-shaped bracket broadly indicated by reference numeral 40 is shown for supporting the bumper bar 12" in position to protect the platform P' from impact as when a vehicle abuts the same. The U-shaped bracket 40 comprises upper and lower outwardly extending leg portions 41 and 42, respectively, whose rear end portions are joined together by a web portion 43 which is suitably secured as by welding to the outer face of the angle plate M.

Accordingly, there has been provided a protective guard to receive the impact of a truck or the like abutting the same and wherein the guard is floatingly arranged to permit the impact receiving bumper bar to be elevated or lowered in accordance with the raising and lowering of the truck abutting the same during its being loaded or unloaded.

Although the invention has been described as particularly adaptable for protecting the side of a building, platform or dock from impact upon a truck or powdered vehicle abutting the same, it is to be distinctly understood that the invention is not restricted thereto but may be practiced in any type of operation wherein bumper bars are employed or needed, such as along wharfs for protecting the same from ships, boats and the like.

In the drawings and specification there has been set forth several embodiments of the invention and, although specific terms are employed, they are used in a generic and descriptive sense only and not for purposes of limitation, the scope of the invention being defined in the claims.

We claim:

1. In combination with a building or the like, a protective guard adapted to protect the building from impact, said protective guard comprising an elongated horizontally disposed bumper bar having spaced apart vertically arranged bores therein, rods penetrating said bores and extending beyond the upper and lower edges of said bumper bar, means for resiliently supporting said bumper bar to permit the same to be moved in a vertical path of travel on the rods, and means securing said rods to the building.

2. A guard according to claim 1 wherein the ends of said rods are positioned in spaced relation to the upper and lower edges of the bumper bar, and said means for resiliently supporting said bumper bar comprises resilient means positioned between the lower edge of the bumper bar and the lower ends of the rods.

3. A guard according to claim 1 wherein said means securing the rods to the building comprise brackets positioned in spaced relation to the upper and lower edges of said bumper bar and said rods penetrate said brackets and are carried thereby.

4. In combination with a dock, a protective guard comprising an elongated horizontally disposed bumper bar having spaced apart vertically disposed bores therein, bolts loosely extending through said bores in the bumper bar, brackets carrying said bolts, means securing the brackets to the dock, the upper edge of said bumper bar being in spaced relation to said brackets, and resilient means mounted on said brackets and engaging the lower edge of said bumper bar to maintain the bumper bar in spaced relation thereto whereby upon a truck or the like abutting the bumper bar and thereafter being loaded, the bumper bar may be moved downwardly therewith in accordance with the load on the truck.

5. In combination with a building or the like, a guard for protecting the building against impact upon a truck or the like abutting the same, said guard comprising an elongated bumper bar having vertically disposed bores therein adjacent its opposite ends, brackets positioned in spaced relation to the upper and lower edges of said bumper bar, means securing the brackets to the building, bolts carried by said brackets and loosely penetrating said bores in the bumper bar for maintaining the bumper bar in a vertical path of travel, and a coiled spring surrounding the lower end of each of said bolts and being positioned between the lower edge of the bumper bar and the corresponding bracket to resiliently support the bumper bar thereon.

6. In combination with a building or the like, a protective guard adapted to protect the building from impact, said protective guard comprising an elongated horizontally disposed bumper bar having spaced apart vertically arranged bores therein, rods penetrating said bores and extending beyond the upper and lower edges of said bumper bar, means for supporting said bumper bar to permit the same to be moved in a vertical path of travel on the rods, and means securing said rods to the building.

References Cited in the file of this patent

UNITED STATES PATENTS

| | | |
|---|---|---|
| 1,628,651 | Burress | May 17, 1927 |
| 2,620,239 | Gruenais | Dec. 12, 1952 |
| 2,842,939 | D'Auriac | July 15, 1958 |

FOREIGN PATENTS

| | | |
|---|---|---|
| 1,031,969 | France | May 25, 1953 |